Aug. 27, 1940.  W. N. CHITTENDEN  2,212,855
COMBINATION TOOL HEAD AND GRINDING MACHINE
Filed Oct. 6, 1937  4 Sheets-Sheet 3

INVENTOR
WINDSOR N. CHITTENDEN
BY
Harold K. Parsons
ATTORNEY

Patented Aug. 27, 1940

2,212,855

UNITED STATES PATENT OFFICE 2,212,855

COMBINATION TOOL HEAD AND GRINDING MACHINE

Windsor N. Chittenden, Chagrin Falls, Ohio, assignor, by mesne assignments, to The Cincinnati Milling Machine Co., Cincinnati, Ohio, a corporation of Ohio Application October 6, 1937, Serial No. 167,48?

17 Claims. (Cl. 51—95)

This invention relates to a combination tool head and grinding machine, and is a continuation in part of my copending application for patent, Serial No. 106,660, filed October 20, 1936.

One primary purpose of the present invention is to provide a special type of grinding machine structure combined with a special tool head structure, whereby unusual and new cooperative operations of the two units mentioned may be obtained. By such special combination I have secured a machine for manufacturing and re-conditioning tools possessed of versatility of operation adjustment and efficiency not heretofore achieved in this art.

Another object of this invention is to provide a construction of the above character which will be sturdy and well able to withstand hard usage. Another object is to provide a construction of the above character which may be quickly and easily operated by the user. Another object is to provide an efficient and practical combination tool head and grinding machine. Another object is to provide a construction of the above character which is adapted to work upon a large variety of different types of tools. A further object of the above construction is to provide a combination tool head and grinding machine which is more versatile than any previously known, and which is adapted for use to quickly and cheaply accomplish the various grinding or sharpening operations required in the maintaining of small sharpening tools, such as twist drills, reamers, countersinkers, milling cutters, hobs, and the like. A still further object of this invention is to provide apparatus which enables the grinding or sharpening of tools or the like with greater precision than has heretofore been obtainable.

A special feature of improvement employed in the present machine as distinguished from the tool head feature of my copending application, lies in the provision of peculiar adjusting means for the guide or table supporting the tool holding devices of the tool head, whereby slight inaccuracies that might be caused by the bending moment induced by operation of the screw adjusting means that shifts the guide or table longitudinally are substantially completely avoided. The importance of this feature of my invention will be recognized if it is understood that in finer tool manufacture and re-conditioning, inaccuracies of the slightest extent, running into mere thousandths of an inch, may prevent the completion or re-conditioning of a perfect tool or the like.

Still another feature of my invention resides in the employment, for the longitudinal movement of the said guide or table for the tool holding device of the tool head, of alternatively usable adjusting means, one adapted for handy use in the event the disposition or adjustment of the guide or table positions the other adjusting means where it may be more or less inaccessible for operation. Also, the one of the said adjusting means which is always accessible may be used advantageously under all conditions where the finest adjustments are not needed in the operations of tool manufacture and re-conditioning.

Additional to the foregoing, the invention involves the employment of main and auxiliary grinder holding devices with which the grinding machine unit of my combination machine is equipped, the auxiliary grinder holder being availed of under special conditions of use where the main holder cannot be employed at all or is not susceptible of advantageous use. Moreover, the auxiliary holder is designed to be operated at much higher speed than the main holder, as may be required for certain kinds of work.

Other objects will be in part obvious and in part pointed out hereinafter.

In the drawings:

Figure 3 is a side elevation of the guide or table for the tool head, looking at the opposite side from that disclosed in Figure 2, showing the plurality of adjusting means employed for adjustment of the guide or table of the tool head;

Figure 1:
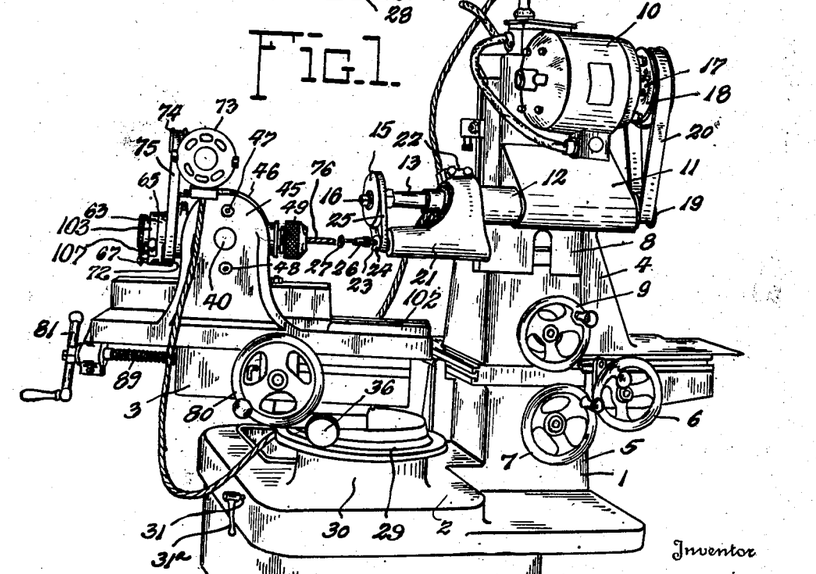
Figure 1 is a perspective view of a combination tool head and grinding machine embodying the general features of the invention.

Now referring to the drawings, and especially to Figure 1, 1 indicates the frame structure of a grinding machine which is provided with a lateral extending support 2 for carrying a tool head generally indicated at 3. While this part is here properly termed a "tool head," as the work is shown in the form of a tool, yet it may also be more broadly termed a "work head" and the part held thereby as the "work."

The frame structure of the grinding machine is further provided with an upper part 4 longitudinally and transversely movable with respect to the lower frame structure 5. The longitudinal and transverse movement of the portion 4 of the frame structure is accomplished by the operation of hand wheels 6 and 7, respectively.

By turning the hand wheel 6, longitudinal movement of the frame portion 4 is effected, while turning of the hand wheel 7 causes a transverse movement thereof. Mounted on the upper frame structure 4 is a movable part or guide 8 which is secured to the portion 4 by means of dove-tailed guide members or the like usually employed in this art. The vertical movement of the member 8 is effected by rotation of a hand wheel 9. Mounted upon the vertical guide member 8 is an electric motor 10, which is rigidly secured thereto and represents the source of power for the working operations of the grinding machine. A bearing or supporting structure 11 extends laterally from the vertical guide 8 and carries a sleeve like bearing 12 fixed thereto.

Figure 2:
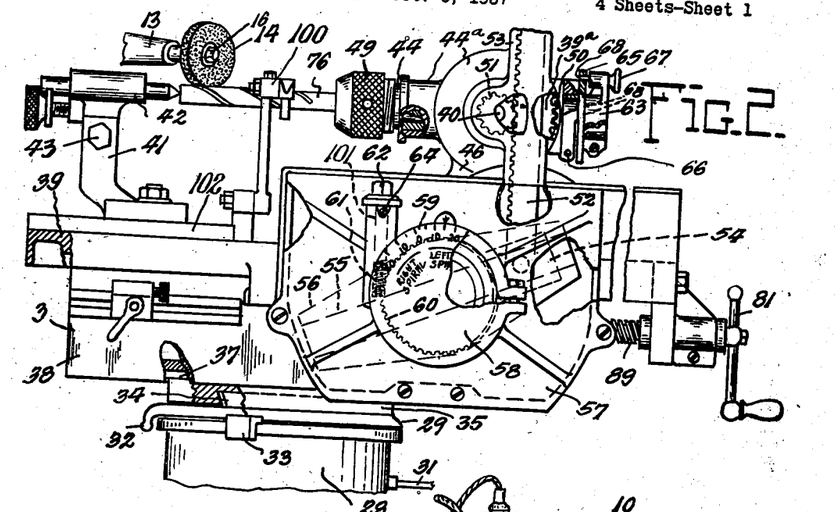
Figure 2 is a view in end elevation of the tool head with certain of the parts broken away and shown in section.

Arranged within the sleeve-like bearing portion 12 is a shaft 13 which is adapted to carry at one of its ends a grinding wheel 14 such as shown in Figure 2, or it may carry a pulley 15 as illustrated in Figure 1.

Securing means 16 are provided on the shaft 13 to permit an easy attachment of either the grinding wheel 14 or the pulley 15.

The motor 10 (Figure 1) comprises the usual shaft 17 upon which a pulley 18 is mounted. The shaft 13 carries at its end adjacent the pulley 18 a pulley 19 interconnected for rotation with the pulley 18 by means of a belt 20. Attached to the outer circumference of the stationary bearing sleeve 12 is an auxiliary grinder holding device 21 provided with clamping instrumentalities 22. When the clamping instrumentalities 22 are loosened, the auxiliary grinder holding device may be swung into operative or inoperative position.

Figure 1 shows the auxiliary grinding holder device in operative position in which it is held securely by clamping means 22 when the same are tightened. The auxiliary grinder holding device carries a shaft 23 mounted within the body of the grinder holding device in any conventional manner, and a pulley 24 is keyed to said shaft and is rotatably interconnected with shaft 13 by means of a drive belt 25 which engages the pulley 15.

The free end of the shaft 23 carries a chuck 26 to which is secured a small grinding wheel or any equivalent device, as illustrated at 27.

When it is contemplated to use the grinding wheel 14, as shown in Figure 2, the auxiliary grinder holding device 21 is swung out of the way upwardly, and locked in this position, while the pulley 15 and the driving belt 25 are removed to permit attachment of the grinding wheel 14 to the shaft 13. With the parts in this position, any regular grinding operation may be performed by the grinding machine as will be more apparent from the following description; while, when the auxiliary grinder is used, as shown in Figure 1, very fine and delicate grinding operations may be obtained by the use of the small grinding device 27 and the dimensions of the pulleys 15 and 24 permit grinding device 27 to be rotated at ample speed to accomplish the most accurate grinding, sharpening, or reconditioning operations.

Figures 4, 5:
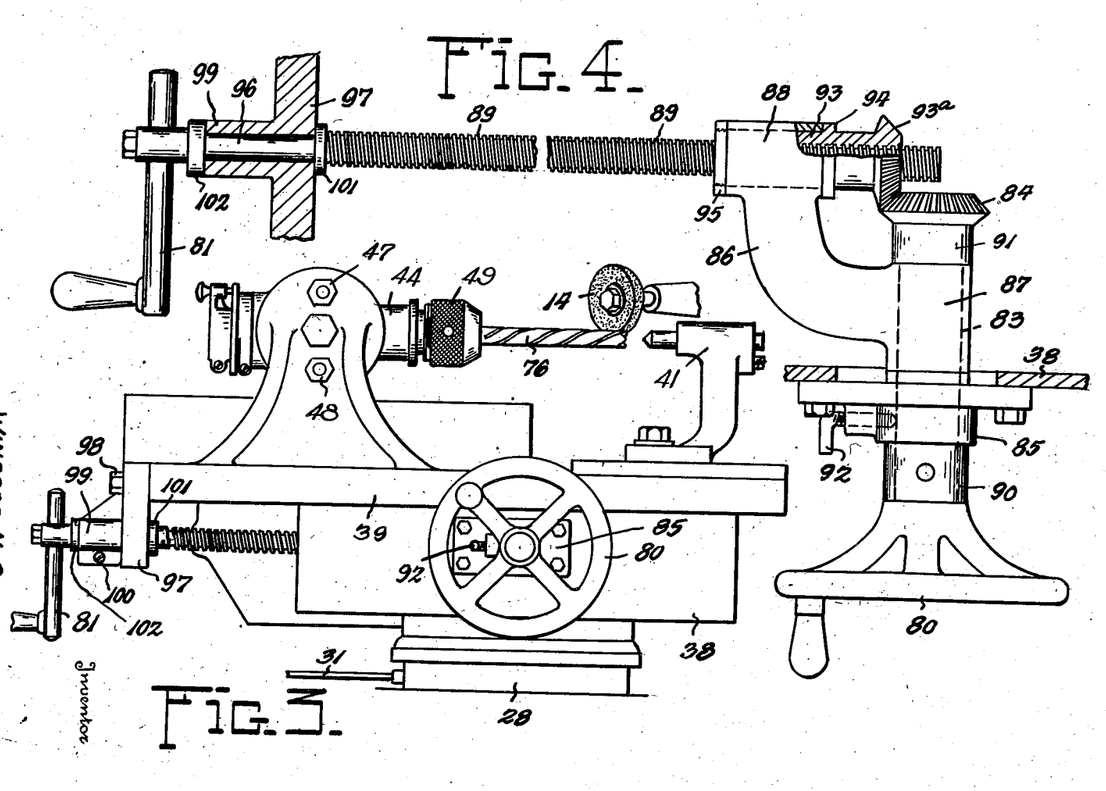
Figure 4 is a partial section and partial top plan view showing more fully the adjusting means for the guide or table of the tool head.
Figure 5 is an end elevation taken from the right hand side of the machine shown in Figure 2.
Figure 5:
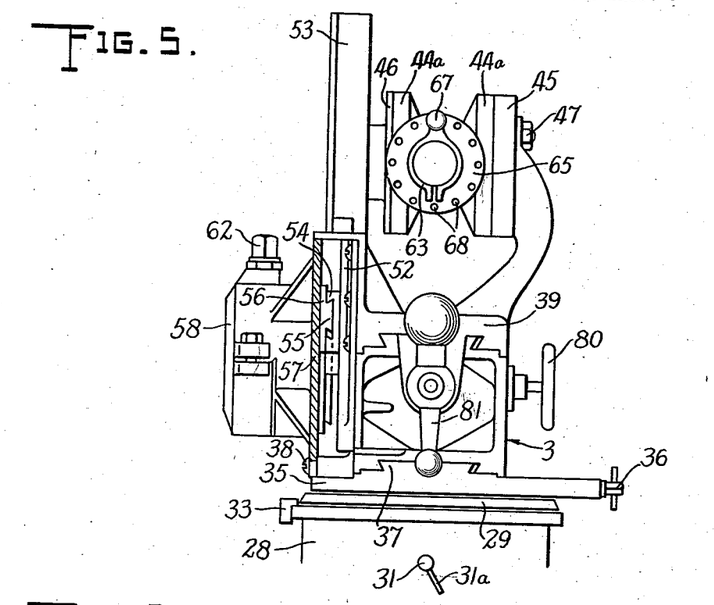

The grinding machine structure referred to above, as illustrated in Figures 1, 2, and 5 is primarily adapted to be used in connection with the tool head 3, which is carried by the support 2 which forms a part of the grinding machine frame as previously referred to. The tool head structure 3 comprises a base or shoe 28 within which a turnable part 29 is rotatably mounted.

As best seen in Figures 1 and 2, the base 28 is fastened to a tubular portion 30 by inserting the lower portion of the base 28 therein and securing the same thereon in any convenient manner. However, if desired base 28 may form an integral structure of the portion 30 of the support 2. Between base 28 and part 29 anti-friction bearing members may be positioned to facilitate the rotation of the part 29 around the vertical axis of the base 28.

Locking instrumentalities 31 (Figures 1, 2, and 5) are employed for locking part 29 in any desired angular position with respect to base 28. The locking means 31 which carries the handle 31a is preferably positioned within the support 2 as will be clearly seen from Figure 1. Part 29 is preferably provided with a flange having graduations or other indicia thereon to indicate the relative position thereof respecting the base 28 and stop members 32 and 33 on the rotatable part 29 and the stationary part 28 may be provided to facilitate the setting of the rotary adjustment of part 29 with respect to the base. One of these stop members, preferably the stop member 33, is so positioned on the base 28 that it may be shifted to a desired position and locked.

Referring now more specifically to Figures 2 and 5, it will be noticed that the part 29 is provided with a dovetail guide 34 upon which a slide member 35 is mounted, the latter being transversely adjustable with respect to the turnable part 29 of the base by means of adjusting screw 36 as shown in Figures 2 and 5 which engages a nut which is not illustrated and which forms a part of the rotatable base member 29. This arrangement permits an offsetting in a horizontal plane of the tool head apparatus with respect to the base and again graduations between the relatively moving parts may be employed to show the amount of offset.

The slide member 35 carries likewise a dovetailed guide 37 (Figures 2 and 5) upon which the main frame or bed 38 is mounted. This guide 37 is positioned at a right angle with respect to the guide 34 to permit an offset adjustment of the main frame 38 at a right angle to the slide member 35. A table or slide 39 is arranged for longitudinal shifting movement with respect to the main frame 38 and this shifting movement is caused by the operation of manually operable instrumentalities such as screw 89, crank member 81 (Figure 1) and hand wheel 80. The instrumentalities which effect the longitudinal shifting movement of the table or slide 39 are illustrated in Figures 3 and 4, and more specifically described later on.

It will be understood, however, that by operating the crank 81 or hand wheel 80, as will be seen in specific reference to Figures 3 and 4, the table 39 will be shifted longitudinally in one direction, whereas by turning the above mentioned parts 80 and 81 in an opposite direction, the table will be shifted also in an opposite direction.

A tailstock 41, the use of which is optional, is mounted on guides 102 (Figure 2) and is of a more or less conventional construction, but the upper part 42 of the same may be pivoted around the screw connection 43 which also permits positioning and locking of the part 42 at a desired angle. The table 39 carries a spindle 44 (Figures 1, 2, and 5) rotatably mounted in suitable bearings within the housing structure 44a. The housing structure 44a is pivotally mounted on shaft 40 (Figure 2) which extends transversely of the machine and is journaled in bearings (not shown) mounted on uprights 45 and 46. These uprights (Figure 5) form an integral structure with the table 39, and thus housing 44a and spindle 44 are vertically adjustable with respect to the tool head. The adjustment of the spindle 44 to any angular position is effected by loosening and tightening the clamping screws 47 and 48, and thus the machine is adapted to mount tools at different angles as their shape requires. Table 39 also carries an adjustable indicating feeler or finger 100, which traverses the flutes of a tool on movement of table 39 to ensure that the settings are correct according to the desired ultimate result when the grinding wheel is set in operation.

One end of the spindle 44 carries the chuck 49 (Figures 2 and 6), or any tool receiving means to be mounted on the spindle. Mounted on the spindle 44 at its end opposite chuck 49 is a gear 50 within the housing or head 44a. This gear 50 is in cooperative engagement with the gear 39a mounted upon axis or shaft 40, the latter extending transversely through the housing 44a at the side of the upright support 46. The housing is somewhat enlarged at that portion to receive the comparatively large gear 39a just referred to.

Another gear 51 on shaft 40 engages the teeth of rack 52, slidably arranged within a casing 53 attached to the housing 44a. The lower end of the rack 52 (Figures 5 and 6) is pivoted to the block 54 which has a dove-tailed groove 55 operatively connected to a sine bar 56. The sine bare 56 is pivotally mounted on a front plate 57 and is provided at its hub bearing portion 58 with graduations 59.

The hub of the sine bar 56 is provided with teeth 60 (Figures 2 and 6) engaged by a worm 61 which may be operated by placing a crank handle upon the square end portion 62 of the worm shaft 101. The worm 61 may be either of the self locking type or may be locked by a set screw 64 when the sine bar has been moved to a desired position of inclination.

The gear 50, previously referred to, is loosely mounted upon spindle 44 and is provided with a hub portion to which an indexing plate 65 is secured by means of a clamp 66. The end of the spindle 44 opposite chuck 49 carries a member 63 fixed to the spindle and supporting an axially shifting pin 67 which may be manually moved in and out of engagement with holes 68 (Figure 5) in the plate 65. When the pin 67 is engaged with one of the holes 68 it will be held in this engaged position by means of certain instrumentalities, not shown, which shift the pin axially toward the plate 65 when the pin 67 which is manually operated is released.

In view of the fact that the part 63 is fastened to the spindle 44, it will be seen that by removing the pin 67 from one of the holes 68 of the plate 65, the spindle may be manually rotated to a desired position where it may be held by placing pin 67 in the hole in the indexing plate 65 which is at that time juxtaposed to the pin. This turning of the spindle permits the positioning of a tool to be sharpened, reconditioned, or manufactured by the machine of the present invention, which is indicated in Figure 1.

This adjustment of the spindle may be called the indexing adjustment of the tool head. Obviously, during such indexing operation, the engagement between the plate 65, gears 50, 39a, 51, and rack 52, is interrupted.

Figure 6:
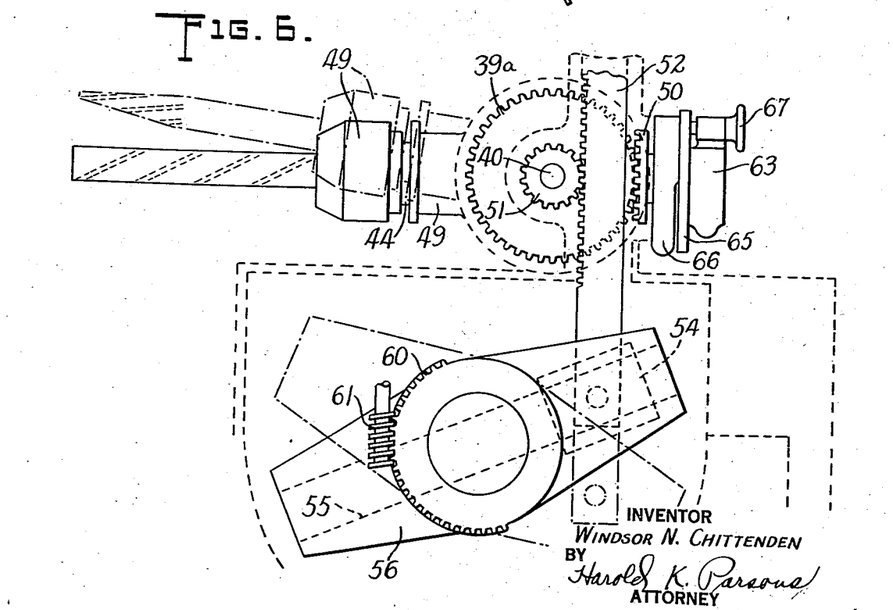
Figure 6 is a fragmentary detailed view on an enlarged scale illustrating the mechanism by which the rotation is imparted to the tool mounting spindle.
Figure 7:
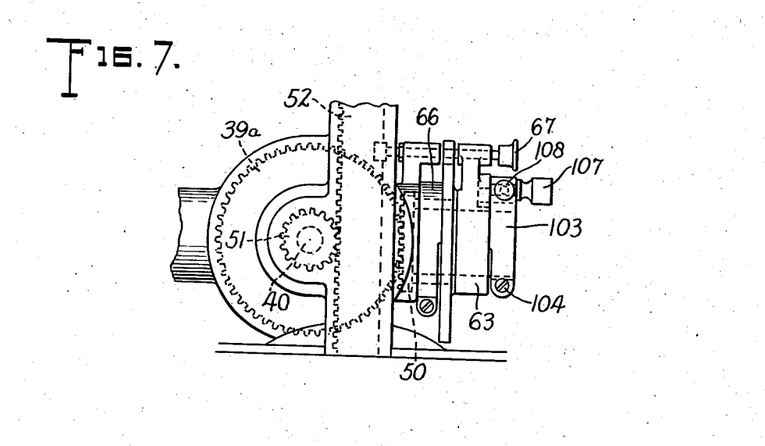
Figure 7 is a side elevation of a modification of a portion of the machine shown in Figure 1.
Figure 8:
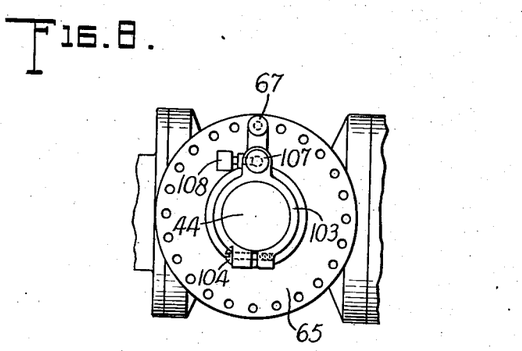
Figure 8 is an end elevation taken from the right hand side of the modification shown in Figure 2; and, Figure 9 is a perspective view on an enlarged scale of certain parts of the mechanism shown in Figures 7 and 8.
Figure 9:
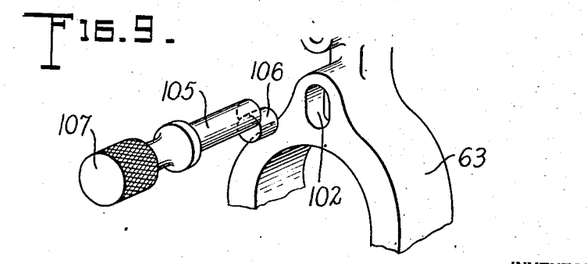

Referring now to Figures 7, 8, and 9, there is shown in these figures a modified form of indexing mechanism for finer indexing adjustments than the indexing instrumentalities shown in Figures 2, 5, and 6. In the modified construction, the same or a similar indexing plate 65 is employed, together with its clamping means 66 for clamping the same about the hub of gear 50, it being understood that this gear 50 is loosely mounted on the spindle 44. As described hereinabove, a member 63 is positioned adjacent indexing plate 65 and carries a pin 67 for selective interengagement with the holes 68 of the indexing plate. However, member 63 is loosely mounted on the spindle 44 instead of being clamped thereto as in Figures 2, 5, and 6 and member 63 is also provided with an elongated aperture 102, as best seen in Figure 9. Next to the member 63 is a third member 103 (Figure 7), generally similar to member 63 but having provision for clamping engagement about the spindle 44 through means of the clamping instrumentalities designated 104. This member 103 carries a pin 105, which is rotatably mounted thereon, and the inner end of the pin is provided with an eccentric portion 106 engageable in the elongated aperture 102 of member 63. Thus, by rotating the pin 105 through means of the adjusting knobs 107 provided thereon, a relatively fine indexing adjustment of the spindle 44 may be attained intermediate the coarser indexing adjustments selectively provided by the selective interengagement of the pin 67 with the holes 68 of the indexing plate 65. A set screw 108 is preferably provided on the member 103 so as to permit the pin 105 to be secured in a position of selective relatively fine indexing adjustment.

The periphery of index plate 65 is shaped to receive a belt driven by motor 73 through pulley 74. In such case the clamp 66 is loosened so as to disconnect the driving connection between the indexing mechanism and the rack 52. The spindle 44 may be now rotated at a certain speed without being affected by operations caused by the rack and gear arrangements referred to above.

Referring now more particularly to the operation of the tool head for performing certain grinding, or reconditioning operations, it will be noted that when the sine bar 56 is positioned at a certain given angle (Figures 2 and 6), the longitudinal movement of the table 39 and the parts supported thereby will cause the slide block or slide member 54 to slide along the sine bar and reciprocate rack 52 upwardly and downwardly causing rotation of the spindle. As has been pointed out hereinabove, the sine bar 56 may be set so that it inclines upwardly to the left or right of the machine as viewed in Figure 2. Thus, the spindle, in response to movement of the table in a given direction, may be made to rotate in either a clockwise or a counterclockwise direction, the direction and degree of rotation depending on the direction and degree of inclination of the sine bar.

Thus, the degree of rotation of the spindle 44 for a given amount of longitudinal movement of the table 39 can be varied as desired, and when the sine bar 56 is in horizontal position, no rotation is imparted to the spindle 44. The operation of the tool head by the handle 81 or hand wheel 80 permits, therefore, a shifting of the tool 76 toward the grinding wheel 14 or 27, while at the same time the tool is rotated according to the adjustment of the sine bar so that the grinding wheel may be maintained in operative contact with the tool 76 over a spiral path such as the spiral cutting edge of a drill, or the like. Also, the straight cutting edges of a reamer may be sharpened by this machine. In this case, the sine bar would be set at a zero or horizontal position so that no movement is imparted to the reamer which would be in such case secured to the spindle 44 by chuck 49.

It follows from the above that the tool to be reconditioned is moved against the grinding wheel 14 and away from the same by the shifting of the table 39 in either direction of its longitudinal movement. The shaft 44 may be positioned in a vertical angular position with respect to the grinding wheel 14 or the grinding wheel 27, and the other adjusting and offsetting adjustments of the tool head with respect to the base 2 of the grinding machine and grinding wheel 14 permit of a great flexibility of positioning the tool to be reconditioned with respect to the grinding instrumentalities of the grinding machine.

The various adjustments of the grinding machine itself permit furthermore the adjustment of the grinding instrumentalities 14 or 27 in many ways, i. e., in horizontal, longitudinal and vertical directions, with respect to the tool head so that a great versatility of operation, adjustment and efficiency not heretofore achieved in this art of machinery can be obtained and this great flexibility of the entire device permits the manufacture or reconditioning of tools or like devices of the most difficult and precise construction, as will be appreciated by those skilled in the art.

Referring now more specifically to Figures 3 and 4, the manually operable means for causing longitudinal shifting of the table 39 are especially designed to permit the accomplishment of highly accurate work with the apparatus of the present invention.

It will be obvious to those skilled in the art that upon operation of the handle 81, as clearly shown in Figures 1 and 2, a bending moment is applied to the table 39 which tends to move the same either upward or downward with respect to the base 28 of the structure 1 of the tool head. In view of the fact that the handle 81 is at a remote position with respect to the vertical center of the base 28, and in view of the fact that the guide or table 39 and the other longitudinal and transverse guides employed in the tool head structure of the present invention have some play, even though very slight, the action of the above mentioned bending moment will cause a very slight up and down movement of the table 39 and tool 76, and while these movements are hardly noticeable, they will nevertheless cause certain inaccuracies in the grinding operation. To eliminate this disadvantage, a hand wheel 80 has been provided beside the handle 81. Both of these operating means for the screw 89 may be alternatively used for shifting the table 39, and the hand wheel 80 will be primarily used in such instances where greatest precision of workmanship is desired because the hand wheel 80 is, during all adjustments of the apparatus, either above or very close to the vertical center of the base 28 and obviously the bending or up and down movement of the table 39 is practically eliminated when the hand wheel is employed for longitudinal shifting of the table.

Referring more specifically to Figure 4, the hand wheel 80 is mounted on a shaft 83, which carries a bevel gear 84 and is supported by a bearing flange 85 on the frame 38. A bridge 86 with a bearing sleeve 87, and a part 88 holds the free end of a screw 89 in a certain position with respect to shaft 83. Removal of the shaft 83 is prevented by means of collars 90 and 91. A lock device 92 permits locking of shaft 83 in any position of rotation. Rotatably mounted within the bearing 8 of the bridge 86 is an inwardly threaded sleeve 93 provided with a bevel gear 93a cooperating with gear 84.

The sleeve 93 is further provided with an integral shoulder 94, and a removable shoulder 95 secured to the sleeve in any convenient manner. The other end of the screw 89 comprises a reduced shank 96 mounted in a bearing 97 secured to the table 39 by means of head screws 98. The bearing 97 is provided with a clamping portion 99 which may be tightened by a screw 100 for locking shank 96 and screw 89 in any position of rotation. Secured to the free end of the shank 96 is the handle 81 already referred to, and collars 101 and 102 are fastened to shank 96 in any conventional manner to prevent longitudinal movement of the screw 89.

When the shaft 83 is locked against rotation and the clamp 99 loosened the screw 89 may be rotated by means of the handle 81 while the sleeve is in fixed position secured to the frame 38 by means of bridge 86 and shaft 83.

The screw 89, will, therefore, move with regard to the sleeve 93 so that a relative shifting between means 39 and 38 is accomplished. When operation of the parts 39 and 38, relative to each other by means of the hand wheel 80 is desired, all that is necessary is to tighten clamp 99 by means of screw 100 and to loosen lock 92. In this case, screw 89 is locked against rotation, and bevel gear 93a and sleeve 93 are rotated by means of hand wheel 80, shaft 83 and bevel gear 84, and a relative shifting of the parts 39 and 38 is produced.

The employment of the handle 81 is necessary because when the machine is rotated around its base 28, the hand wheel 80 may be very close under certain conditions to the grinding machine frame 1, and may, therefore, be very inconvenient to operate.

From the above it will be noted that depending upon the nature of work to be performed with the machine of the present invention, a grinding tool is attached to the grinding tool holder 16 of the tool shaft 13, or a grinding tool 27, see Figure 1, is attached to the auxiliary tool shaft 23, after the same has been moved to operative position and interconnected for operation with the tool shaft 13 by means of pulleys 15 and 24 and drive belt 25. Upon operation of the motor 10, either the tool shaft 13 and grinder 14, or the tool shaft 13, auxiliary tool shaft 23 and grinder 27, are operated at desired speed.

The tool to be resharpened, as for instance tool 76, is inserted into the tool holder 49 and either the grinder 14 or grinder 27 is brought into proper cutting position by manipulation of the adjustments 6, 7 and 9 as described hereinabove. Thereupon, the tool head which carries the tool holder 46 and the tool 76 is properly adjusted and positioned so that by turning of the hand wheel 80 or handle 81, the tool 76 is moved into engagement with the rotating grinder to effect the desired grinding operations.

As mentioned hereinbefore, the grinder 14 or grinder 27 may be adjusted in any desired vertical, lateral or horizontal position with respect to the tool 76 which is to be resharpened, reconditioned, or which is to be manufactured from original stock.

In a like manner, the tool head affords any desired adjustment of the tool 76 with respect to the grinder 14 or 27, so that all working operations can be easily carried out. The arrangement and construction of the tool head permits further angular adjustments thereof with respect to its horizontal, vertical and lateral planes, and affords further a rotation of the tool 76 to any desired degree in either direction, while the tool and tool head are moved toward and away from the grinder upon operation of the hand wheel 80 or handle 81.

From the above, it will, therefore, be seen that the machine affords a universal adjustment and operation enabling its use for producing and refinishing many diversified kinds of tools, and is, therefore, of a versatility never heretofore accomplished in machinery of this kind.

Moreover, it is to be noted that one of the primary fuctions of this invention is to provide in a usable combination of parts the required mechanical motion facilities so arranged as to make possible the completion of all essential and accessible grinding operations required on practically any type of small tool, at a single chucking operation.

The foregoing result is achieved or made possible by virtue of the combination of the available mechanical movements of parts of the machine in all planes as related to the work being produced, thereby enabling the operator to establish the nodal points and generate dimensionally at a single chucking of the work in the work holder all geometrical forms which can be produced by grinding.

As exemplifications of the adaptability of the invention to practical tool making and refinishing, the following is a resume of the different kinds of work that can be performed and for which the machine is especially designed as a material improvement over the former practices in this art which frequently involve as many as six set-ups or chucking steps, oftentimes on different machines, to complete a single job, and in each of which chucking or set-ups there is necessarily some "run-out" which is multiplied at every subsequent operation:

1. A machine constructed in accordance with the present invention will grind spiral fluted, right or lefthand spiral, straight or taper, end mills, reamers, milling cutters, and the like, from a solid hardened blank, completing production of the tool at a single setting or chucking operation.

2. The machine will grind circular diameters, straight or taper, with male or female radii grinding angles circularly in either the vertical or horizontal plane, or any combination of these, to predetermined geometrical precision, and at a single chucking.

3. The machine will grind hollow mills, including the outside diameter, inside diameter, face, lip, and back off each succeeding part of the tool as required and specified at a single chucking of the work.

4. The machine will grind cherrying or form cutters, generating all geometrical parts of the tool dimensionally, and back off same at a single chucking.

5. The machine will generate any true spiral lead from zero to one and one-third turns per inch.

6. The machine will grind certain types of punches such as squares, triangular, flats, hexagon, and many modifications of these forms, from a solid blank.

7. The machine will grind almost any kind of router completing the entire tool from a solid blank and at a single chucking.

8. The machine will grind all accessible parts of circular form cutters for screw machine practice.

9. The machine will grind all parts of many mechanical accessories such as spindle noses, collets, ball races, spines, etc., locate and produce any number of succeeding movements dimensionally, and complete these operations at a single chucking, with assurance of the utmost in precision and concentricty.

Other tools too numerous to mention may be added to the foregoing, but it will suffice to say that the present invention makes possible the quick and inexpensive production of many types of tools by grinding from solid hardened blanks without preliminarily machining, as well as an unusual economical reconditioning of tools to give an extended tool life.

Having thus described my invention, what I claim as new and desire to secure by Letters Patent of the United States, is—

1. In a combination grinding machine and tool head, a grinding machine, a main grinding device, an auxiliary grinding device associated with the main grinding device and normally held in inoperative position, driving instrumentalities cooperating with the main grinding device for operating said auxiliary grinding device when the same is in position for operation, a tool head associated with said grinding machine, comprising a tool holder, a table supporting said tool holder, and means for adjusting said tool holder longitudinally, vertically, and transversely relatively to the auxiliary grinding device, and instrumentalities for adjusting the auxiliary grinding device vertically, longitudinally, and transversely relatively to said tool holder.

2. In a combination grinding machine and tool head, a grinding machine comprising a holder for a grinder, means for adjusting said holder longitudinally and transversely, instrumentalities to shift the holder vertically and hold it in various vertical positions, and a tool head associated with said grinding machine comprising a tool holder, a table supporting said tool holder, mechanism for imparting rotation to the tool holder at a fixed ratio of speed determined by the longitudinal movement thereof, means for adjusting said tool holder longitudinally and transversely relatively to the grinder, devices to render the said mechanism for imparting rotation to the tool holder at a fixed ratio of speed inoperative to so actuate the tool holder, and driving mechanism for rotating the tool holder when the above mechanism is rendered inoperative.

3. In a machine of the class described, in combination, a supporting table, a work head mounted thereon for longitudinal movement, means mounting said table to permit angular movement thereof about a substantially vertical axis, an instrumentality for effecting such longitudinal movement of the table, a work holder carried by the table and movable therewith whereby the effective radius of swing about said vertical axis is varied, instrumentalities for causing rotation of the work holder at a ratio of speed determined by the longitudinal movement of the work holder with the work head, means to set the last mentioned means to render the same inoperative and thus discontinue the rotation of the work holder under the influence of the longitudinal movement of the work head, a motor, and means for effecting driving rotation of the work head by said motor when the above mentioned instrumentalities are incapacitated for rotating the work head.

4. In a combination grinding machine and tool head, a grinder, a holder for said grinder, means for adjusting said holder longitudinally and transversely, instrumentalities to shift said holder vertically and hold it in various vertical positions, and a tool head associated with said grinding machine comprising a work holder, mechanism for imparting rotation to said work holder, a table supporting said work holder, means for adjusting said work holder longitudinally, transversely, and devices for enabling adjustment and to maintain said work holder at different degrees of vertical and horizontal angularity relatively to said grinder.

5. A grinding machine comprising a holder for a grinder, adjusting means for effecting horizontal adjustments of the grinder, devices to shift the grinder vertically and maintain it in different positions when so shifted, a work head comprising a table, a work holder mounted on said table for vertical angular adjustment, mechanism for imparting rotation to the work holder, means to lock said vertical angular adjustment in any position thereof, means for moving the table to feed the work holder longitudinally toward the grinder, means adapted to govern said rotation of the work holder proportionally to said feed and thereby rotate the work through an angle determined by said feed, and means for rotating the table in a horizontal plane to thereby give different angular adjustments horizontally to the work holder.

6. A grinding machine comprising a holder for a grinder, adjusting means for effecting horizontal adjustments of the grinder, devices to shift the grinder vertically and maintain it in different positions when so shifted, a work head comprising a table, a work holder mounted on said table for vertical angular adjustment, mechanism for imparting rotation to the work holder operative at any vertical angular adjustment thereof, means to lock said vertical angular adjustment in any position thereof, means for moving the table to feed the work holder longitudinally toward the grinder, means adapted to govern said rotation of the work holder proportionally to said feed and thereby rotate the work through an angle determined by said feed, means for rotating the table in a horizontal plane to thereby give different angular adjustments horizontally to the work holder, and means for effecting transverse shifting movement of the work holder separate from its horizontal angular adjustment.

7. In a grinding machine, the combination of a tool-carrying spindle and a work-carrying spindle, means for rotatably mounting said spindles, means for adjusting each of these spindle mounts laterally, vertically, and longitudinally relative to the base of the machine, means providing an additional swiveling movement of the work carrier in a horizontal plane, means providing an angular adjustment of the work-carrying spindle in a vertical plane, a sine bar, a sine bar device for giving the work-carrying spindle a rotary movement when advancing it longitudinally relative to the tool, and means operatively connecting said device for actuation of said last spindle with any desired angular adjustment of said spindle with respect to said device.

8. In a machine of the character described, in combination, a tool support, a work carrier, means providing relative adjustment of said tool support and carrier vertically, laterally, and longitudinally, means mounting said work carrier to permit swinging thereof in two planes, and means comprising gearing adapted to rotate said work carrier proportionally to its advance toward the tool and maintain substantially fixed angular relation of the meshing teeth of said gearing.

9. In apparatus of the class described, in combination, a rotatable spindle, means mounting said spindle for vertically tilting and bodily horizontal adjustment, means for feeding said spindle, and means for imparting rotation to said spindle responsive to feeding movement thereof and operatively connected therewith at any vertical angular adjustment thereof, said last-mentioned means comprising a relatively stationary guide member arranged at an angle to the path of feeding movement of the spindle, a slide member coacting with said guide member and slidable thereon responsive to feeding movement of the spindle, and a rack and pinion means interconnecting said slide member with said spindle, through the axis about which said spindle is tiltable.

10. In apparatus of the class described, in combination, a rotatable spindle, means mounting said spindle for vertically tilting and bodily horizontal adjustment, means for feeding said spindle and means for imparting rotation to said spindle at a constant ratio with respect to the feeding movement thereof and operatively connected therewith at any vertical angular adjustment thereof, said last-named means comprising a relatively stationary guide member, a guide slot within said guide member and extending longitudinally with respect to the latter, said means for imparting rotation to the spindle being arranged at an angle to the path of feeding movement of the spindle, a slide member coacting with the guide slot of said guide member and slidable therein responsive to feeding movement of the spindle, and rack and pinion means interconnecting said slide member with said spindle, through the axis about which said spindle is tiltable.

11. In apparatus of the class described, in combination, a rotatable spindle, means mounting said spindle for longitudinal shifting movement, means for shifting said spindle longitudinally, and means for imparting rotation to said spindle responsive to longitudinal shifting movement thereof, said last named means comprising a stationary sine bar having a dovetailed part, a slide member mounted on said sine bar and slidable on said part responsive to longitudinal shifting movement of the spindle, and rack and pinion means interconnecting said slide member with said spindle for converting the sliding movement of said slide member into a rotary motion of said pinion means and spindle at a constant ratio respecting the longitudinal shifting movement of the spindle.

12. In apparatus of the class described, in combination, a rotatable spindle, means mounting said spindle for longitudinal shifting movement, manually operable means for shifting said spindle, means for imparting rotation to said spindle responsive to longitudinal shifting of the same, means for rendering said last named means ineffective, additional power driving means, and means adjustable at will for interconnecting said power driving means with said spindle for rotating the latter when the first mentioned spindle rotating means is rendered ineffective.

13. In a combination grinding machine and tool head, grinding mechanism comprising a main grinder, a holder therefor, an auxiliary grinder, a holder therefor, power transmitting means for operating the auxiliary grinder and its holder from the main grinder and its holder, a tool holder, devices for holding the said grinders in different positions vertically, longitudinally, and transversely relatively to the tool holder, a tool head supporting the tool holder with the latter in operative position to be acted upon by the main and auxiliary grinders, a table for supporting said tool head, mechanism for shifting the tool holder in vertical, and horizontal planes, and for shifting the tool holder into different positions by movement in a vertical plane relatively to the grinders, and means for rotating the tool holder.

14. In apparatus of the class described, in combination, a rotatable spindle, means mounting said spindle for longitudinal shifting movement, means for shifting said spindle longitudinally, a stationary sine bar adjustable at an angle to the path of longitudinal shifting movement of the spindle, a slide member mounted on said sine bar and slidable thereon responsive to longitudinal shifting movement of the spindle, a rack pivotally connected to the slide member and reciprocable thereby, a pinion operatively engaging said rack and rotatable thereby, means operatively connecting said pinion with said spindle for rotating the latter by rotation of the spindle, wherein means is interposed between the pinion and the spindle for indexing the spindle, said indexing means including a rotatable member freely mounted on the spindle and geared to the pinion for rotation thereby and provided with a series of apertures therein, a second member also freely mounted on the spindle and carrying shiftable detent means selectively interengageable with the apertures aforesaid, and having an elongated aperture therein, and a third member fixedly mounted on the spindle and carrying a rotatably adjustable pin having an eccentric portion operatively interengageable with the elongated aperture in the second member for permitting relatively fine indexing adjustments intermediate the coarser adjustments afforded by the detent means and cooperating apertures aforesaid.

15. A tool head for supporting and manipulating tools during the manufacture or reconditioning thereof, comprising a base, an elongated bed mounted on said base and adjustably turnable about the vertical axis thereof, means for adjusting said bed in at least one direction laterally respecting the vertical axis of said base, a table mounted on said bed and slidably shiftable longitudinally of said bed, manually operable means for shifting said table, a spindle rotatably mounted on said table and longitudinally shiftable therewith, a stationary sine bar adjustably mounted on said bed, a slide member slidable on said sine bar, rack and pinion means operatively connected respectively with the slide member and the spindle and shiftable with the table for rotating the spindle responsive to longitudinal shifting of the table and spindle when the sine bar is adjusted at an angle to the path of longitudinal shifting movement of the spindle, means interposed between the rack and pinion means and the spindle for releasably interconnecting the former with the latter and including spindle indexing means and means for adjusting the angular position of the sine bar whereby to permit the rate of spindle rotation and rotary position of the spindle to be independently adjusted at will.

16. The combination, with a grinding machine having a grinding wheel rotatably mounted thereon, of a tool head for supporting and manipulating tools during the manufacture or reconditioning thereof, said tool head comprising a rotatable spindle, means carried by said spindle for mounting a tool thereon, means mounting said spindle for adjustment toward and away from the grinding wheel aforesaid and for longitudinal shifting movement, instrumentalities for adjusting said spindle in horizontal and vertical angular positions with respect to said grinding wheel, means for shifting said spindle longitudinally, means operable at will for imparting rotation to said spindle responsive to longitudinal shifting movement of the latter, said last named means including spindle indexing means, and an adjustable feeler member cooperative with the spindle and the grinding wheel aforesaid for facilitating adjustment of the spindle, said feeler member occupying a position corresponding to the grinding wheel and indicating the path traversed by the grinding wheel respecting the tool pursuant to longitudinal shifting and/or rotatable movements of the spindle.

17. In apparatus of the class described, in combination, a rotatable spindle, means mounting said spindle for longitudinal shifting movement, means for shifting said spindle longitudinally, and means for imparting rotation to said spindle responsive to longitudinal shifting movement thereof, said last named means comprising a stationary sine bar having a dovetailed part, a worm gear connected to said sine bar, a worm cooperatively associated with said worm gear for imparting rotation to the same and said sine bar for causing angular adjustment of the latter, indicating means on said sine bar for permitting adjustment of said bar to a predetermined position, a slide member mounted on said sine bar on said part and slidable thereon responsive to longitudinal shifting movement of the spindle, rack and pinion means inter-connecting said slide member with said spindle for converting the sliding movement of said slide member into a rotary motion of said pinion means and spindle at a constant ratio respecting the longitudinal shifting movement of the spindle and means for adjusting the angular position of the spindle with respect to said sine bar whereby to permit adjustment of the relation of rotation to the longitudinal shifting movement of the spindle.

WINDSOR N. CHITTENDEN.

CERTIFICATE OF CORRECTION.

Patent No. 2,212,855.                          August 27, 1940.

WINDSOR N. CHITTENDEN.

It is hereby certified that error appears in the printed specification of the above numbered patent requiring correction as follows: Page 3, first column, line 48, for "bare" read --bar--; page 4, second column, line 22, for "bearing 8" read --bearing 88--; page 5, first column, line 36, for "fuctions" read --functions--; and second column, line 25, for "spines" read --splines--; line 29, for "concentricty" read --concentricity--; and that the said Letters Patent should be read with this correction therein that the same may conform to the record of the case in the Patent Office.

Signed and sealed this 29th day of October, A. D. 1940.

(Seal)                                                        Henry Van Arsdale,
                                                             Acting Commissioner of Patents.